(12) United States Patent
Jackson et al.

(10) Patent No.: US 11,987,449 B2
(45) Date of Patent: May 21, 2024

(54) GAP FILLER FOR RECIPROCATING FLOOR SLAT CONVEYOR

(71) Applicant: Keith Manufacturing Co., Madras, OR (US)

(72) Inventors: Daniel Jackson, Madras, OR (US); John Cook, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 140 days.

(21) Appl. No.: 17/861,978

(22) Filed: Jul. 11, 2022

(65) Prior Publication Data

US 2023/0002166 A1 Jan. 5, 2023

Related U.S. Application Data

(63) Continuation-in-part of application No. 17/357,655, filed on Jun. 24, 2021, now Pat. No. 11,383,934, which is a continuation-in-part of application No. 17/079,460, filed on Oct. 24, 2020, now abandoned.

(60) Provisional application No. 62/925,515, filed on Oct. 24, 2019.

(51) Int. Cl.
*B65G 25/04* (2006.01)
*B65G 25/06* (2006.01)

(52) U.S. Cl.
CPC .................. *B65G 25/065* (2013.01)

(58) Field of Classification Search
CPC .............................. B65G 25/04; B65G 25/065
USPC .................. 198/750.2, 750.3, 750.4
See application file for complete search history.

(56) References Cited

U.S. PATENT DOCUMENTS

| | | | | | |
|---|---|---|---|---|---|
| 5,415,271 | A | * | 5/1995 | Foster | B65G 25/065 198/750.3 |
| 5,605,221 | A | * | 2/1997 | Foster | B65G 25/065 198/750.5 |
| 5,655,645 | A | * | 8/1997 | Foster | B65G 25/065 198/750.3 |
| 5,806,660 | A | * | 9/1998 | Foster | B65G 25/065 198/750.3 |
| 5,996,772 | A | * | 12/1999 | Foster | B65G 25/065 198/750.3 |
| 6,763,933 | B1 | * | 7/2004 | Wilkens | B65G 25/065 198/750.3 |
| 7,083,041 | B1 | * | 8/2006 | Foster | B65G 25/065 198/750.2 |
| 7,152,729 | B2 | * | 12/2006 | Wilkens | B65G 25/065 198/750.3 |
| 7,183,755 | B2 | * | 2/2007 | Itoh | H02H 9/025 323/277 |
| 7,243,779 | B2 | * | 7/2007 | Foster | B65G 25/065 198/750.2 |
| 7,316,307 | B2 | * | 1/2008 | Foster | B65G 25/065 414/525.9 |
| 7,461,738 | B1 | * | 12/2008 | Delamarter | B65G 25/065 198/750.3 |
| 7,510,072 | B1 | * | 3/2009 | Wilkens | B65G 25/065 414/525.9 |

(Continued)

*Primary Examiner* — Douglas A Hess
(74) *Attorney, Agent, or Firm* — Bruce A. Kaser

(57) ABSTRACT

For use in a reciprocating floor slat conveyor system having formed slats made of steel, a gap filler for sealing the gaps between side-by-side steel slats includes a portion that extends upwardly into the gap, and a lower portion that is connected to one of the side-by-side slats. The gap filler is installed by pushing down the gap filler into the gap between slats.

1 Claim, 16 Drawing Sheets

(56) References Cited

U.S. PATENT DOCUMENTS

| | | | | |
|---|---|---|---|---|
| 7,556,141 | B2 * | 7/2009 | Foster | B65G 25/065 |
| | | | | 198/860.1 |
| 7,926,646 | B1 * | 4/2011 | Berthelsen | B65G 25/065 |
| | | | | 198/750.3 |
| 8,006,828 | B2 * | 8/2011 | Stout | B65G 25/065 |
| | | | | 198/750.2 |
| 8,708,636 | B2 * | 4/2014 | Jackson | B65G 25/065 |
| | | | | 414/509 |
| 9,187,257 | B2 * | 11/2015 | Drago | B65G 25/065 |
| 9,963,298 | B2 * | 5/2018 | Jackson | B65G 25/065 |
| 11,383,934 | B2 * | 7/2022 | Jackson | B65G 25/065 |

\* cited by examiner

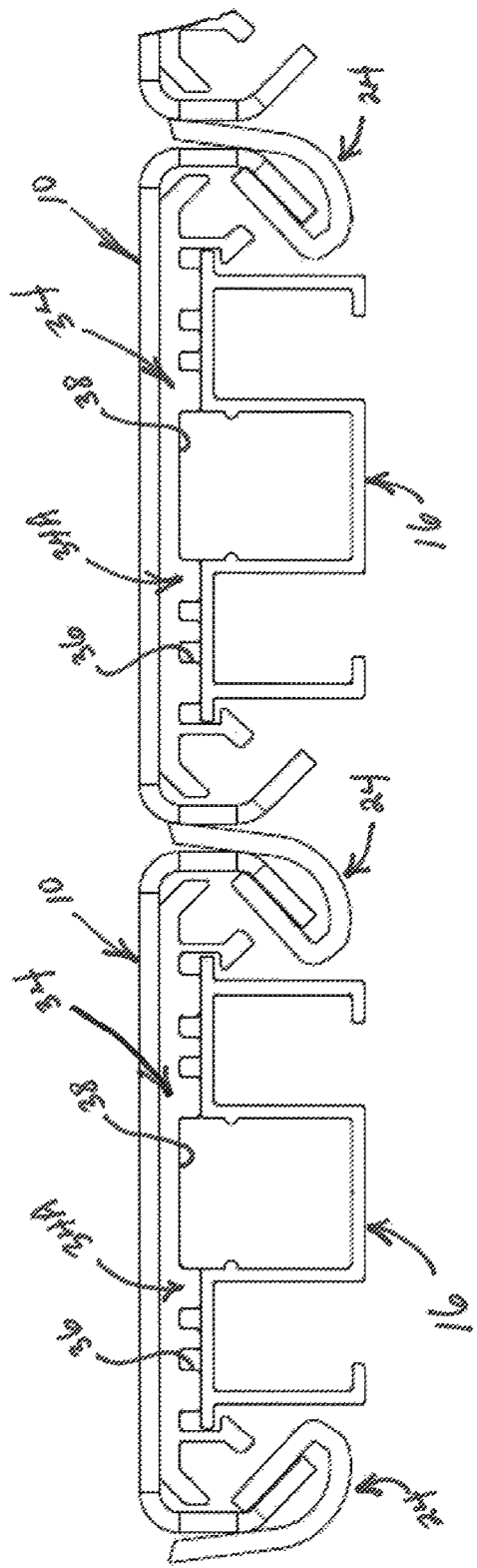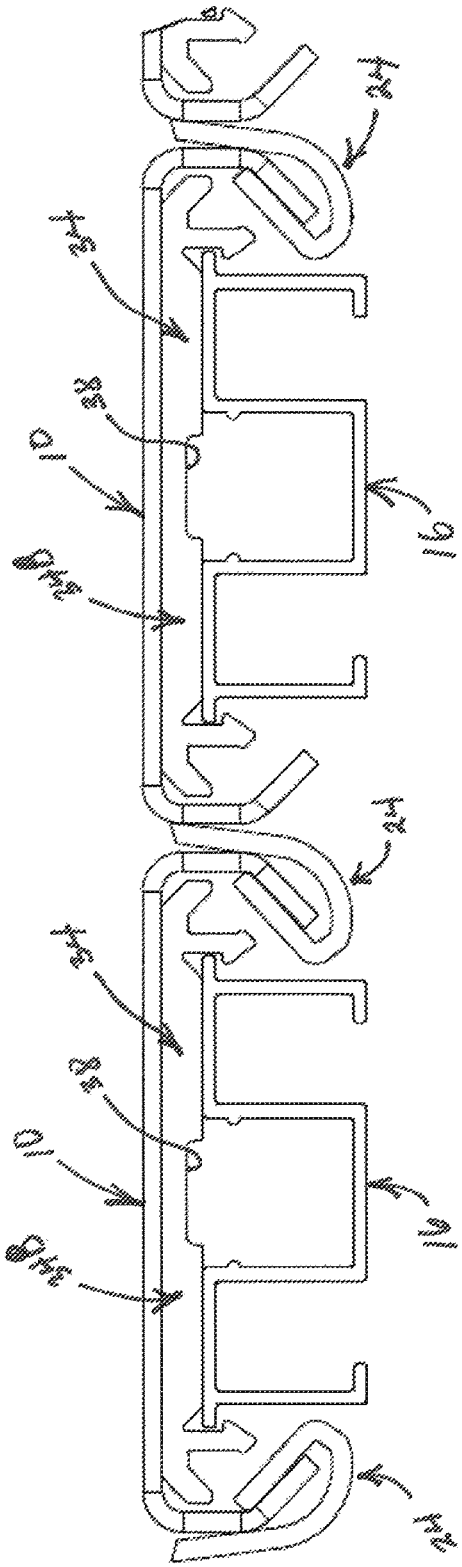

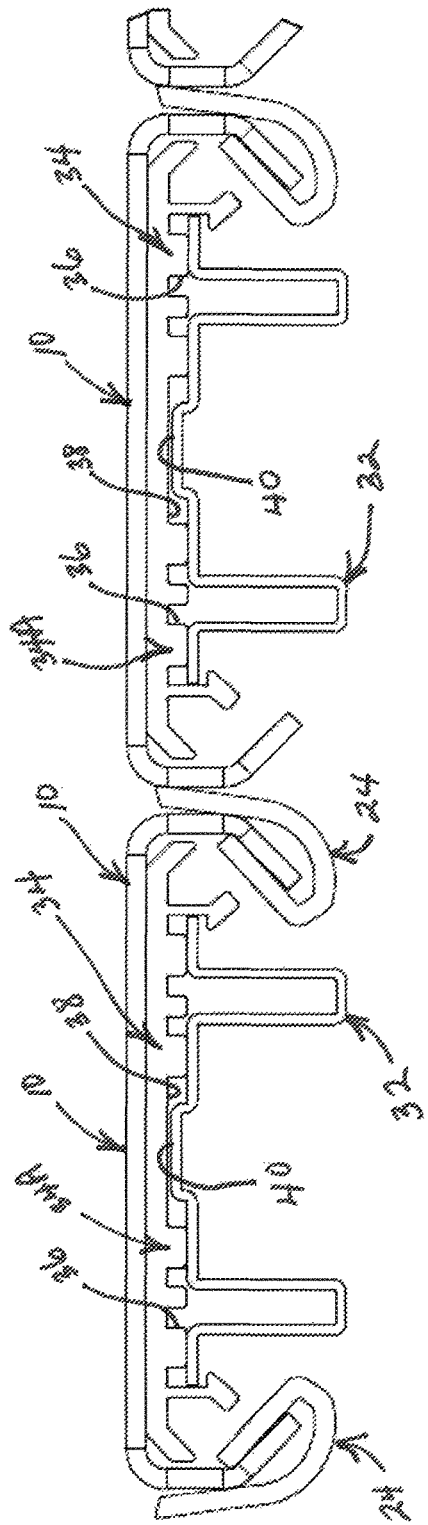

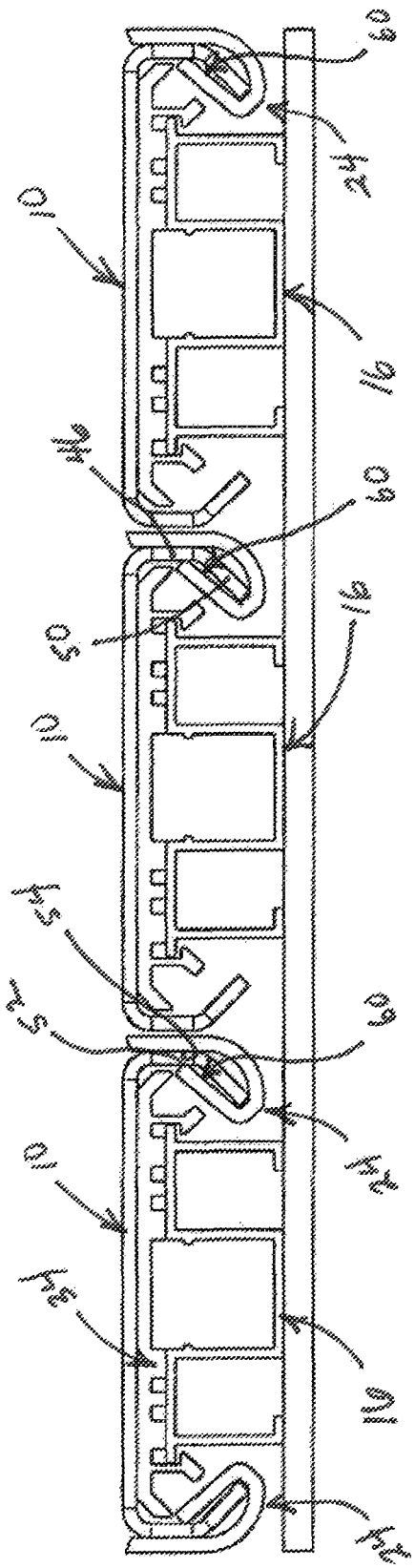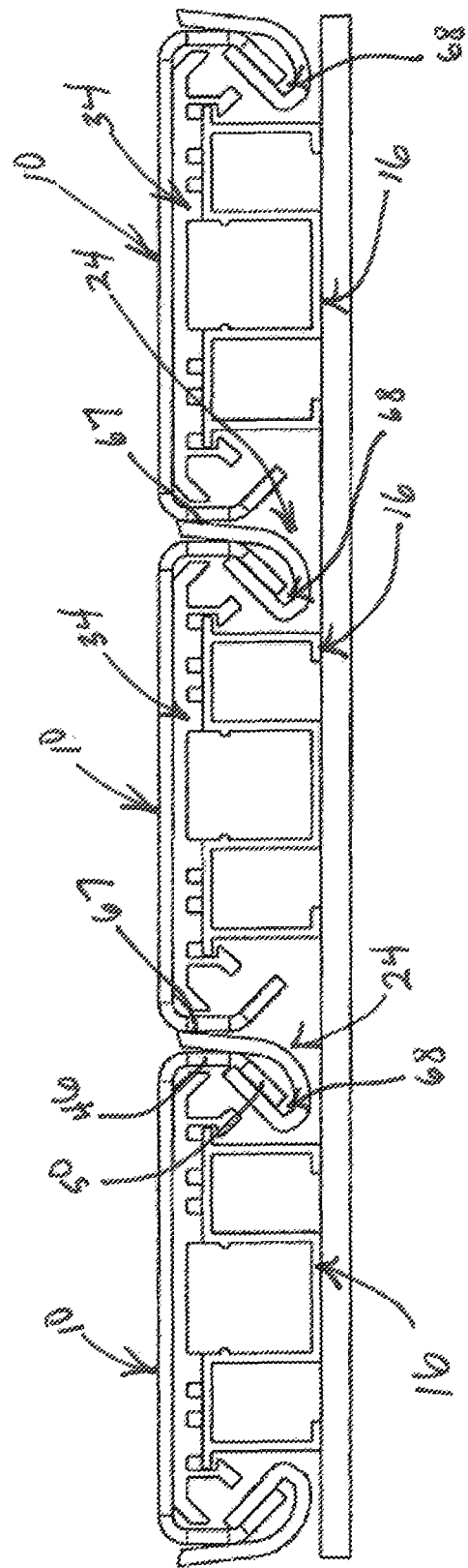

GAP FILLER FOR RECIPROCATING FLOOR SLAT CONVEYOR

TECHNICAL FIELD

This design relates to reciprocating floor slat conveyors.

BACKGROUND

Reciprocating floor slat conveyors are well-known. They consist of a series of side-by-side floor slats that are all moved in one direction at the same time. This moves or conveys a load that rests on the floor slats. Then, a lesser number of floor slats is moved in the opposite direction, sliding underneath the load. This is commonly done in sets of three, or in other words, one third of the slats are moved in the opposite direction, in sequence, until all are returned to their initial position. Moving a lesser number of slats during the return sufficiently reduces friction between the slats and the load above, such that the load holds its position during the return. Then, the slats are moved again, all at the same time, to further carry the load, and so forth, with the sequence just described being repeated until the load is moved off the reciprocating floor slat conveyor. Systems of this kind are often installed in trailers for hauling and unloading bulk materials, although there are also many other kinds of applications, including stationary applications.

The reciprocating floor slats are commonly made from extruded aluminum. However, there is a need and market for steel floor slats. Steel is a better material for floor slats compared to aluminum and would be better for use in the solid waste industry. Regardless of the material that is used to manufacture the slats (i.e., aluminum vs. steel), the space between individual slats (that are side-by-side each other in the installed conveyor) needs to be sealed. In the solid waste industry, for example, where aluminum slats have been used, the seals between slats can be the first thing to fail. The type of seal used for an aluminum slat does not translate for use in a steel slat for reasons relating to differences between aluminum and steel.

The design disclosed here was created to fill the elongated space or "gap" between steel floor slats. The design solves a problem in that it enables the sealing of the elongated gap that is created between individual, roll-formed steel slats. Roll-forming is a different process relative to making extrusions.

Floor slats that are extruded from aluminum can be made with nonuniform wall thicknesses that include elongated seal-holding grooves or recesses. These grooves or recesses can hold a gap-filling seal in place between aluminum slats that are arranged side-by-side across the width of the reciprocating floor conveyor.

Referring to FIG. 22, as an example, which is labeled and acknowledged to be "prior art," a conventional aluminum slat (shown in cross-sectional profile) is indicated at 1. The slat 1 rests upon a bearing member 2. The bearing member 2 is supported by a square subdeck member 3. The gap-filling seal is indicated at 4. As can be seen in this Figure, the seal 4 has an enlarged portion 5 that is captured by a recess 6 in the aluminum slat 1. A split portion 7 of the seal fills the gap (indicated generally by arrow 8), which prevents material from working through the gaps between individual slats as they move back-and-forth during operation of the conveyor (bear in mind that all of these components are elongated and extend lengthwise into the page).

Aluminum can be extruded to the slat form illustrated in FIG. 22 with the seal-capturing recess 6. This is not workable for steel floor stats that are roll-formed from harder and thicker steel alloys, because roll-forming has practical limitations that make it difficult to mimic what can be done (in terms of cross-sectional profile) in comparison to extruding aluminum.

A steel floor slat (that is roll-formed) is therefore likely to have a less complicated cross-sectional profile, relative to an extruded aluminum floor slat, with the steel slat's top and side surfaces having the same thickness throughout, resulting from a single steel strip being put through a roll-forming process that bends the steel into top and side sections. This creates a design problem for sealing the gaps between steel slats because, as indicated above, unlike extruded aluminum, it is not workable to roll-form steel with the kind of seal-holding pockets or recesses (i.e., reference number 6 in FIG. 22) that have been used in the past to seal gaps between aluminum floor slats in reciprocating conveyors.

The design disclosed here makes roll-formed steel slats practical in typical markets where reciprocating floor slat conveyors are used and offers the advantage of using more-durable steel instead of aluminum, particularly when reciprocating floor slat conveyors are built into trailers (or the like) that are used to haul and unload abrasive materials. The design enables a simple steel slat profile to work in reciprocating floor slat conveyors.

SUMMARY

For use with a reciprocating floor slat conveyor that has reciprocating floor slats that are formed from steel, a gap filler that fills the space between side-by-side slats.

The slats in the conveyor will have a lengthwise gap between adjacent side-by-side steel slats that enables the slats to move together, or in reciprocating fashion, according to conventional operation of the conveyor. The gap filler includes an upper portion that extends upwardly into the lengthwise gap. A lower portion of the gap filler, connected to the upper portion as a single integrated piece, is wrapped around a lower side edge of one of the side-by-side steel slats.

The lower portion of the gap filler is made to pinch the lower side edge or sidewall of the steel slat, in the manner described below. This enables the gap filler to be pre-installed on the roll-formed steel slat. During the assembly sequence that involves installing roll-formed steel slats side-by-side across a conveyor, the gap-filler's upper portion is initially elevated vertically relative to its final installation position, which enables the combination of steel slat and gap filler seal to be installed during the assembly of the reciprocating floor conveyor.

Final installation involves pushing down the gap-filler's upper portion (or, in other words, pushing the gap-filler further downward into the gap between side-by-side floor slats). When this happens, the upper portion of the gap filler (in the gap between slats) shifts to close and seal the gap. At the same time, the lower portion of the gap filler is shaped to shift into place around the lower side edge or sidewall of the steel slat, thereby holding the gap filler in position between the floor slats as they subsequently move together, or move relative to each other, according to the operation of the reciprocating floor conveyor. As is described further below, this shifting movement (caused by pushing the gap filler downward) involves the lower portion of the gap filler having an angled surface that rotates to match a surface on the inside of the sidewall of the slat when the gap filler is pushed down. This serves to hold the gap filler in position so that it seals the floor slats properly during conveyor operation.

The gap filler/slat configuration summarized above may ride on a slat bearing structure, with the slat bearing structure further supported by an elongated subdeck component or subdeck member. The subdeck member provides a vertical wall surface, in combination with underlying cross-member structures, that also helps to maintain the gap filler in position following the above-described gap filler installation. Because the gap filler design disclosed here may be used in connection with well-known reciprocating floor drive units, it is also known that locating the drive unit in the reciprocating floor slat conveyor system requires creating a length-wise gap along the length of the plurality of subdeck members that are commonly used in the floor slat conveyor system. In other words, the drive unit is installed in a "window" space that is not spanned by subdeck members that otherwise provide length-wise support for the reciprocating floor slats. In this window space, the drive connections between the drive unit and floor slats provide underlying support for the floor slats. However, because the subdeck members are missing in the window space, the just-described vertical wall surface of the subdeck member is also missing in the window space. To compensate in this specific region of the conveyor system, gap filler supports may be welded to certain parts of the drive unit, in the manner described later.

In addition, it is possible to manufacture steel, roll-formed subdeck members in a manner so that steel subdeck members can be used to replace aluminum subdeck members. Aluminum subdecks are common in the industry, but in some situations, it might be desirable to replace them with steel. In such case, a steel subdeck member can be roll-formed into a shape that provides the same subdeck/vertical wall surface described above.

Like the floor slats, the gap filler is likely to be elongated, although length of the gap filler is a variable. Near the end of the floor slat, however, the lower portion of the gap filler will be independently fastened to the floor slat, where hauled material drops off the conveyor system during the unloading process.

The gap filler design disclosed here makes reciprocating steel floor slats viable for other hauling markets. For example, the combination of steel slat, gap filler, and steel subdeck may enable the hauling of heavier, high-impact materials. Supporting bearings, i.e., the components that rest on the subdeck and provide a sliding surface for the steel slats above, can be extruded as single-piece bearings (in lieu of two separate bearings) that are possibly installed on the subdeck at the same time as individual steel floor slats. This may provide certain advantages for the installer.

The above summary will be better understood upon review of the following description which is to be read in conjunction with the illustrated details of the drawings.

BRIEF DESCRIPTION OF THE DRAWINGS

The accompanying drawings are described as follows, wherein like parts indicate like parts throughout, except where the text indicates otherwise:

FIG. 7 is a cross-section view of two side-by-side reciprocating floor slats made from roll-formed steel, but with a different embodiment of floor bearing;

FIG. 8 is similar to FIG. 7, but illustrates another floor bearing embodiment;

FIG. 9 is similar to FIG. 7 but shows a roll-formed steel subdeck;

FIG. 10 is similar to FIG. 8 but shows a roll-formed subdeck;

FIG. 14 is a cross-sectional view that is similar to FIG. 12, but shows an aluminum subdeck for supporting all-steel floor slats;

FIG. 15 is the same view as FIG. 14, but shows the final position of the gap filler, similar to FIG. 13;

DETAILED DESCRIPTION

Figure 1:
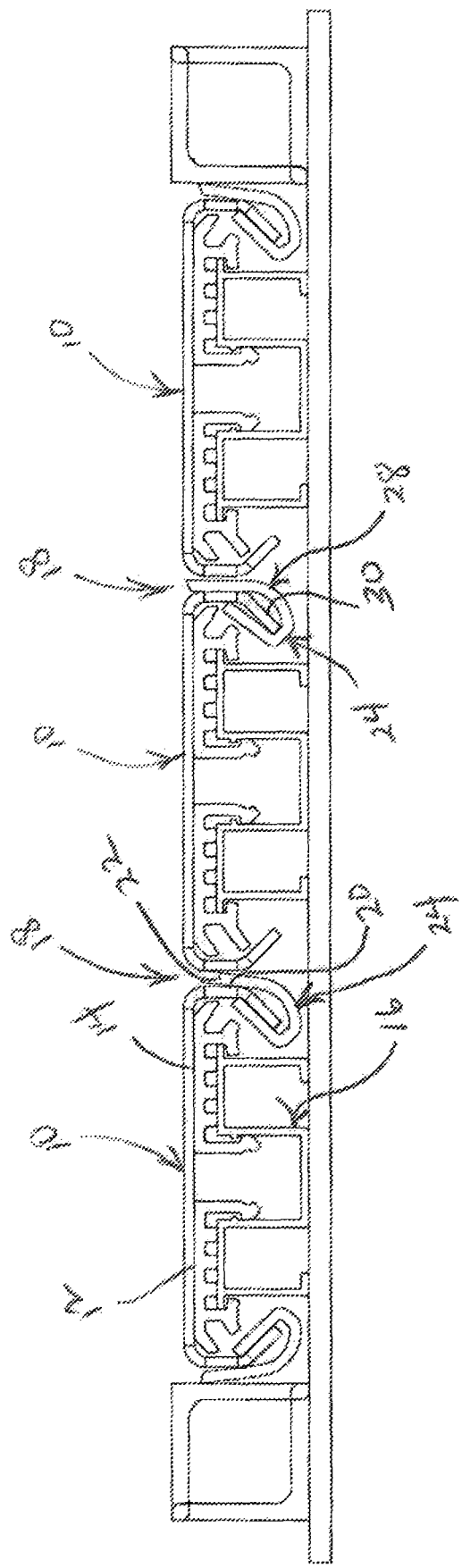
FIG. 1 is a cross-sectional view of a series of side-by-side reciprocating floor slats.

Referring first to FIG. 1, each floor slat is generally identified by reference numeral 10. It is envisioned that the floor slat 10 will be made of formed steel having the shape illustrated in the drawings.

Figure 2:
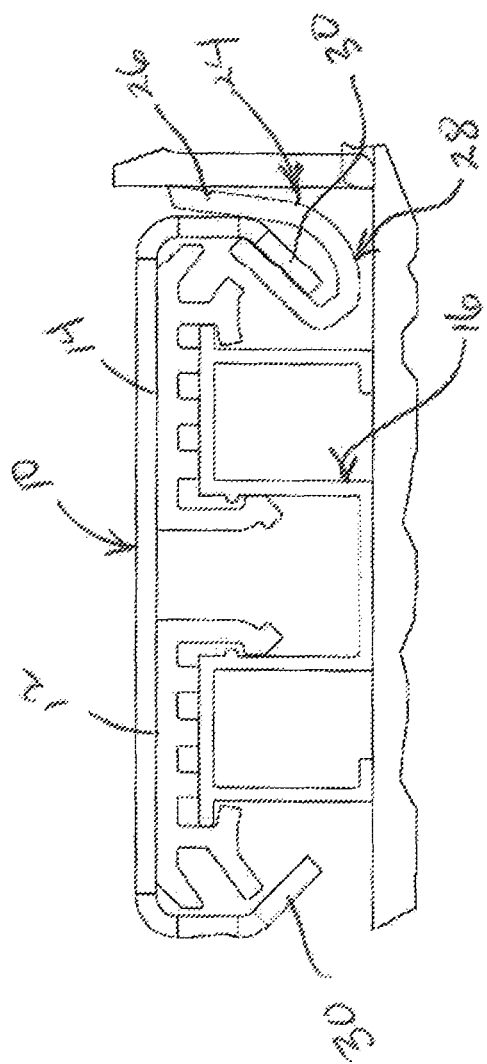
FIG. 2 is an enlarged view of one floor slat of the overall floor slat configuration shown in FIG. 1.
Figure 3:
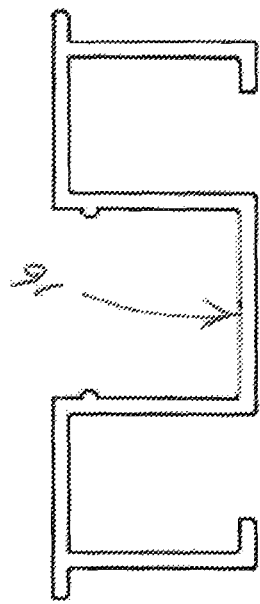
FIG. 3 is a cross-sectional view of a subdeck component of the floor slat configuration shown in FIG. 1.
Figure 4:
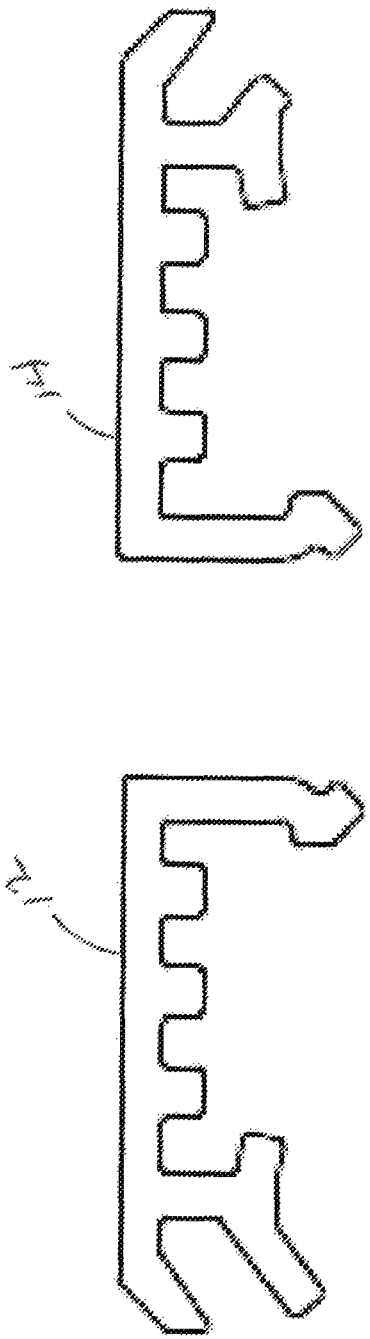
FIG. 4 is a cross-sectional view of floor bearing components of the floor slat configuration shown in FIG. 1.

Referring now to FIG. 2, each floor slat rests upon a pair of bearings 12, 14, which further rest upon a subdeck component, indicated generally at 16. As can be seen in FIG. 1, the floor slats are installed so that a small or narrow gap (at the position indicated by reference numeral 18) will exist lengthwise between the sides 20, 22 of the slats. This gap is filled by the component ("the gap filler") indicated generally at 24 in FIGS. 5 and 6.

The narrow gap 18 between the floor slats is filled by an upper portion 26 of the gap filler 24. The lower portion of the gap filler 24, indicated generally by reference numeral 28 in FIGS. 5 and 6, is wrapped around a lower side edge 30 of the steel floor slat (see, e.g., FIG. 2).

Figure 5:
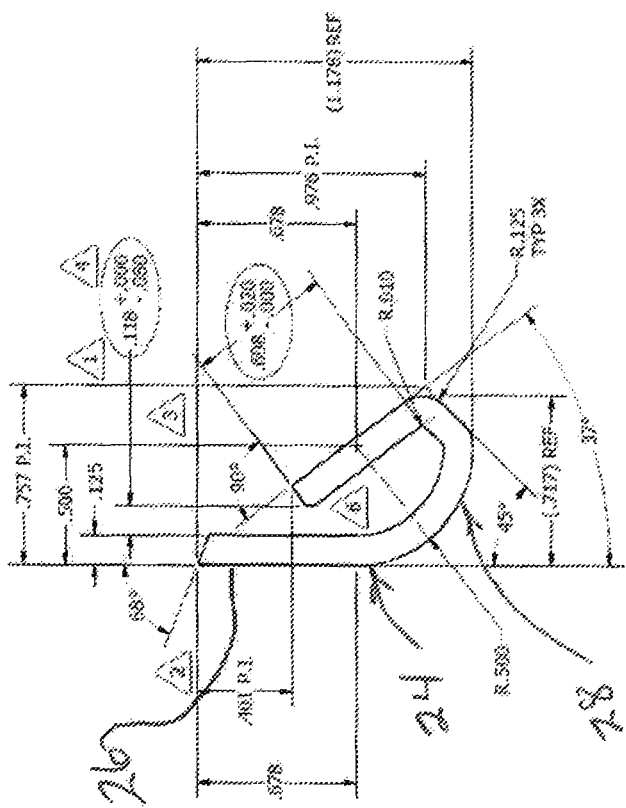
FIG. 5 is a cross-sectional view of a "gap filler" component of the floor slat configuration shown in FIG. 1.
Figure 6:
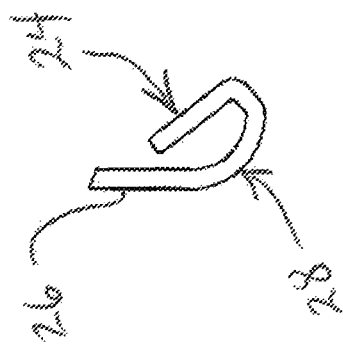
FIG. 6 is a view like FIG. 5, but without dimensions.

Exemplary dimensions of the gap filler 24 are provided in FIG. 5. While these dimensions may vary, it is envisioned that they will be sized so that the lower portion 28 of the gap filler can snap-fit onto the lower side edge 30 of the steel floor slat. This would allow the gap filler to be preinstalled at the place of floor slat manufacture and then shipped, installed, to the end user.

When the floor slats 10 are installed in the manner illustrated in FIG. 1, the upper portion 26 of the gap filler 24 vertically fills gap 18 and is captured in place. It is envisioned that the gap filler 24 can be made from different materials ranging from metal (aluminum, for example) or high-density plastic. This is an ongoing matter of development and test. High temperature UHMW plastic may be used for some hauling applications like asphalt, for example.

Referring now to FIGS. 7 and 8, the subdeck component 16 previously described is illustrated as an aluminum extrusion. As an alternative, the subdeck component 16 could be made from rolled steel, which is illustrated at 32 in FIGS. 9 and 10.

In all the embodiments shown in FIGS. 7-10, the pair of bearings 12, 14 (previously illustrated in FIG. 2) is replaced by a single bearing illustrated at 34. The single bearing 34 is shown as having two versions 34A, 34B. According to the embodiments illustrated here, one version (34A) is designed to have longitudinal grooves 36, while the other (34B) lacks these specific grooves. Both versions (34A, 34B) of the single bearing 34 have a central channel 38. In the embodiment that illustrates the roll formed steel subdeck 32, the central channel 38 of the bearing 34 rests on top of an upwardly projecting portion 40 of the subdeck (see FIGS. 9 and 10). The bearing 34 is made of high density plastic or similar materials already known to be used in connection with making reciprocating floor conveyors.

Figure 11:
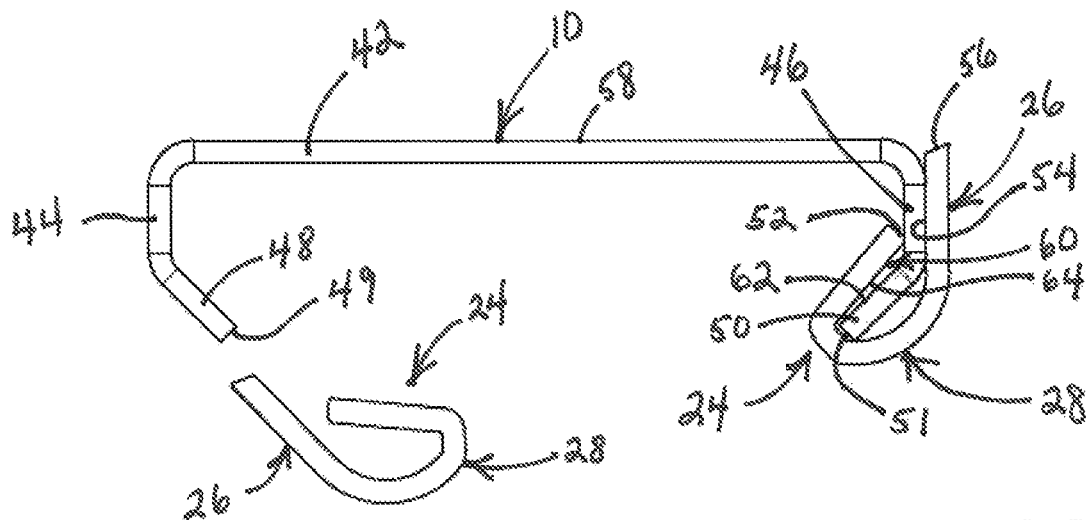
FIG. 11 is a cross-sectional view of a single, roll-formed steel slat, and illustrates how the gap filler is attached to the slat.
Figure 12:
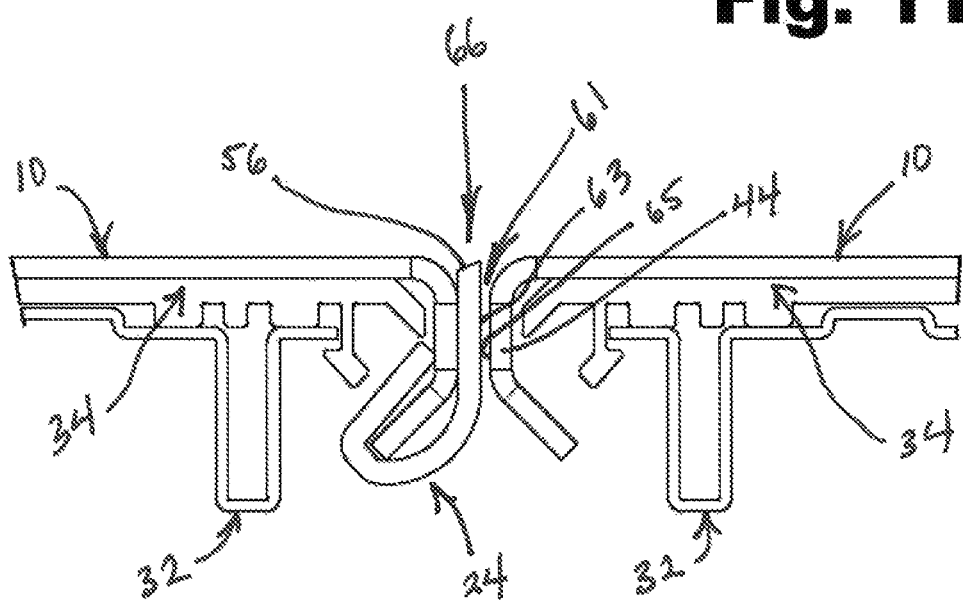
FIG. 12 is a cross-section view that shows the initial position of the gap filler during the floor slat installation process.
Figure 13:
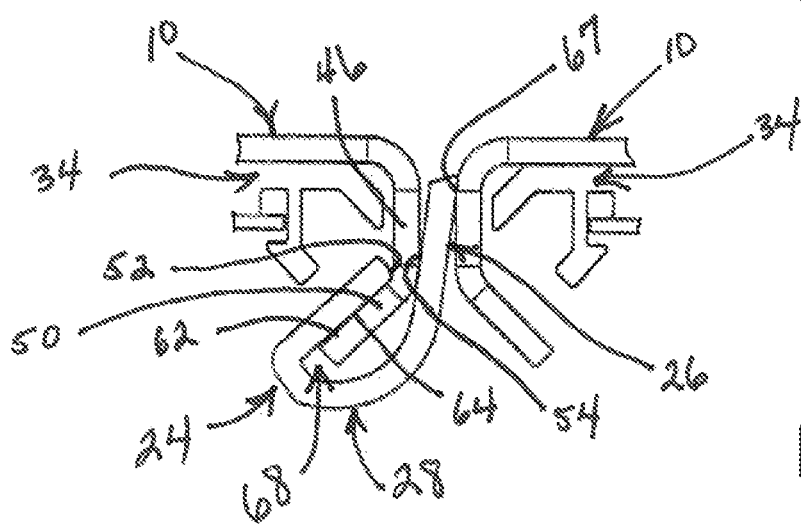
FIG. 13 is an enlarged cross-sectional view of FIG. 12 and shows the final position of the gap filler during the floor slat installation process.

The dimensions of the gap filler 24 provided in FIG. 5 are applicable to the embodiments illustrated in FIGS. 7-19. Referring now to FIGS. 11-13, installation of the gap filler 24 will be described in greater detail.

Referring first to FIG. 11, the roll-formed steel floor slat 10 is shown according to the configuration it would take following the roll-forming process, which would be known in the art. While the steel thickness might vary, a steel thickness of 3 millimeters may be typical. The steel slat has a top portion 42, opposite downwardly depending, vertical side portions 44, 46, and inwardly bending lower side portions 48, 50.

The inwardly bending lower side portions 48, 50 define slants toward the center line of the slat 10. The opposite edges 49, 51 of these side portions are spaced a certain distance apart and create an open width on the bottom of the slat 10. This width opens into the hollow space created by the slat's various walls 42, 44, 46, 48, 50, just described.

The vertical side portions 44, 46 of the steel floor slat 10 define the "gap" between the various steel slats 10 when installed as part of the reciprocating floor conveyor system. As is further described below, the inwardly bending side portions 48, 50 provide surfaces for connecting the lower portion 28 of the gap filler 24 to the steel slat 10.

The left-hand side of FIG. 11 shows the gap filler 24 about to be connected to the slat 10. The right-hand side of FIG. 11 shows the gap filler 24 attached to the slat 10. There, the lower portion 28 of the gap filler 24 is wrapped around the slat's inwardly bending portion 50, with the slat's vertical side portion 46 being captured by the flex in the gap filler 24, which pinches slat side portion 46 generally at the points indicated by arrows 52, 54, respectively. The gap filler dimensions illustrated in FIG. 5 are sized to pinch a 3 millimeter steel slat, although these dimensions could be changed for different installation configurations.

Continuing with FIG. 11, the right-hand side of the Figure shows how the slat/gap filler combination might be provided to an installer prior to installation of the slat/gap filler in a reciprocating floor conveyor system. It should be noted from the Figure that the vertical elevation of the gap filler's upper portion 26 at the top point (see reference numeral 56) is close to the plane of the slat's load-bearing surface (reference numeral 58). There is also a space, indicated generally by arrow 60 in FIGS. 11 and 12, that is present between steel slat edge surface 62 and gap filler surface 64.

FIG. 12 illustrates the same gap filler configuration described above, but with the steel slat 10 resting on the bearing 34 and steel subdeck 32, side-by-side with the same slat/bearing/subdeck combination to the immediate right. This is illustrative of the position of the gap filler 24 during floor slat installation. It should be noted that, at this point, a narrow gap (indicated by arrow 61) still exists between the outside surface 63 of the gap filler 24 and the outside surface 65 of the slat's sidewall 44. Then, the installer pushes down (see arrow 66 in FIG. 12) on the top 56 of the gap filler 24 to shift (some could call it a type of snap fit) the gap filler to the position shown in FIG. 13. There, the vertical elevation of the gap filler's upper portion 26 at the top point 56 is pushed down below the plane of the slat's load-bearing surface 58 and shifts slightly laterally to contact the side of the adjacent slat (see reference numeral 67 in FIG. 13), thereby closing the narrow gap 61 described above; the previously described "pinch" between points 52 and 54 on the slat's side 46 moves down to the approximate location of the bend between the slat's side 46 and inwardly bending portion 50; and gap filler surface 64 rotates and shifts slightly so that surface 64 rests directly against slat surface 62 in lieu of the previously described space 60. This also creates a new space at the location indicated by arrow 68.

The angle of gap filler surface 64 (which could be called a positioning angle) and other gap filler dimensions are selected so that surface 64 matches the angle of slat edge surface 62 after the shift (caused by the installer pushing the gap filler's upper portion 26 downwardly). Matching the angles of these surfaces keeps the upper portion 26 of the gap filler sealing the gap properly (between adjacent slats). As indicated above, gap filler specifications are described in detail directly on FIG. 5. As indicated in the Figure, the positioning angle on the gap filler 24 illustrated there is 37 degrees on a non-attached gap filler. These dimensions could vary if other variations are made to other components.

Figure 16:
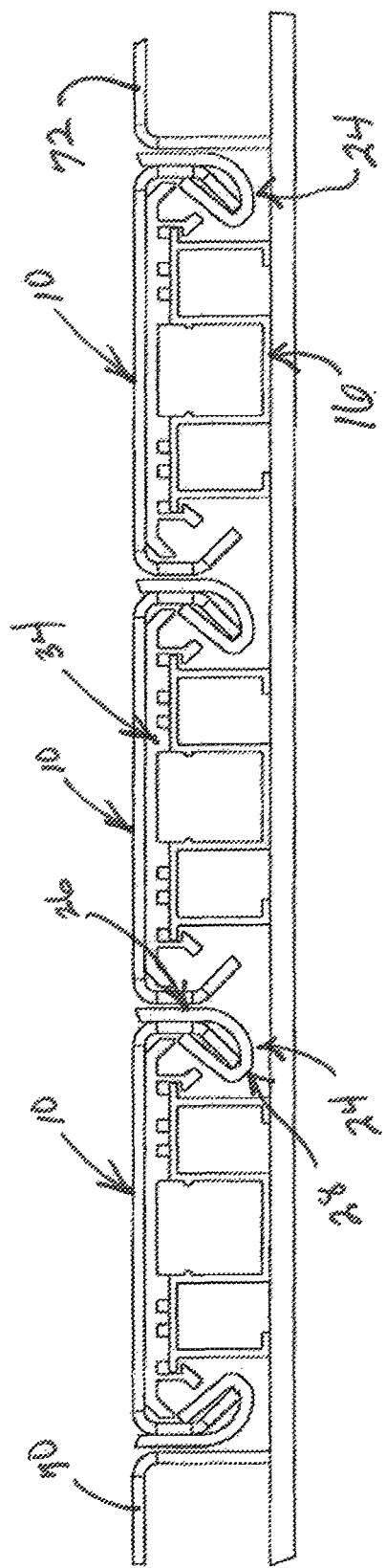
FIG. 16 is a cross-sectional view similar to FIG. 14, but illustrates how the gap filler seals a moving floor slat to a fixed slat on the side of the conveyor.
Figure 17:
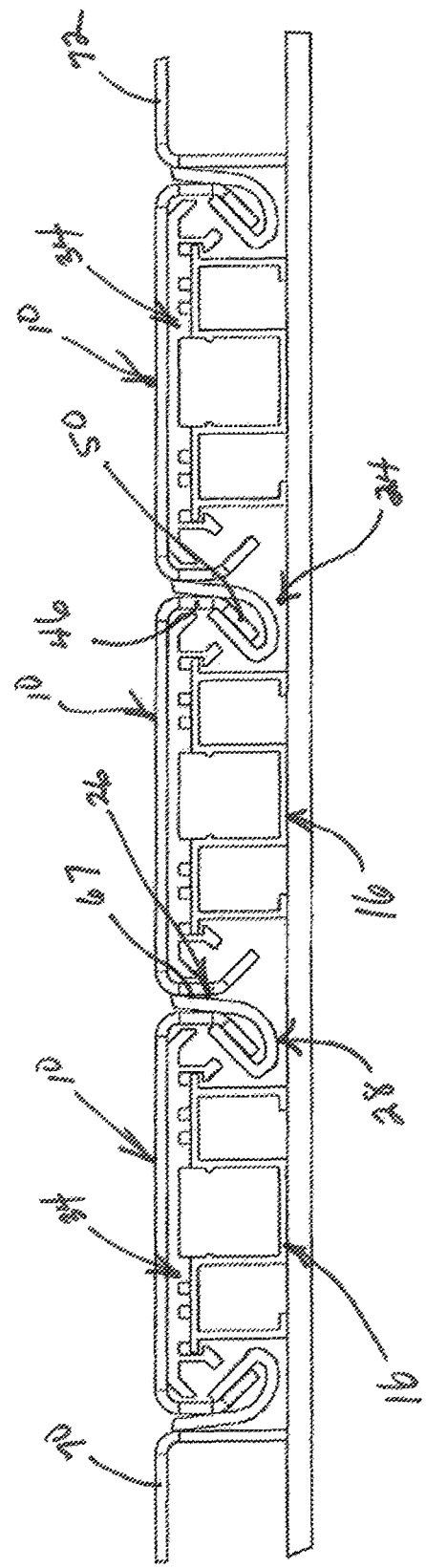
FIG. 17 is the same view as FIG. 16, but shows the gap filler in its final position after installation.

FIGS. 14 and 15 illustrate the above gap filler installation for the aluminum subdeck configuration (FIG. 14 is a counterpart of FIG. 12 while FIG. 15 is a counterpart of FIG. 13), while FIGS. 16 and 17 illustrate the same installation but with fixed side slats 70, 72 that would be (typically) next to the bottom wall of a trailer, one on each side. The trailer is not illustrated, but a person skilled in the art would recognize that these Figures are representative of a larger number of slats that span the distance, from side-to-side, within the trailer's walls, which is typical for reciprocating floor slat systems. The number of slats is usually defined by installation application.

Figure 18:
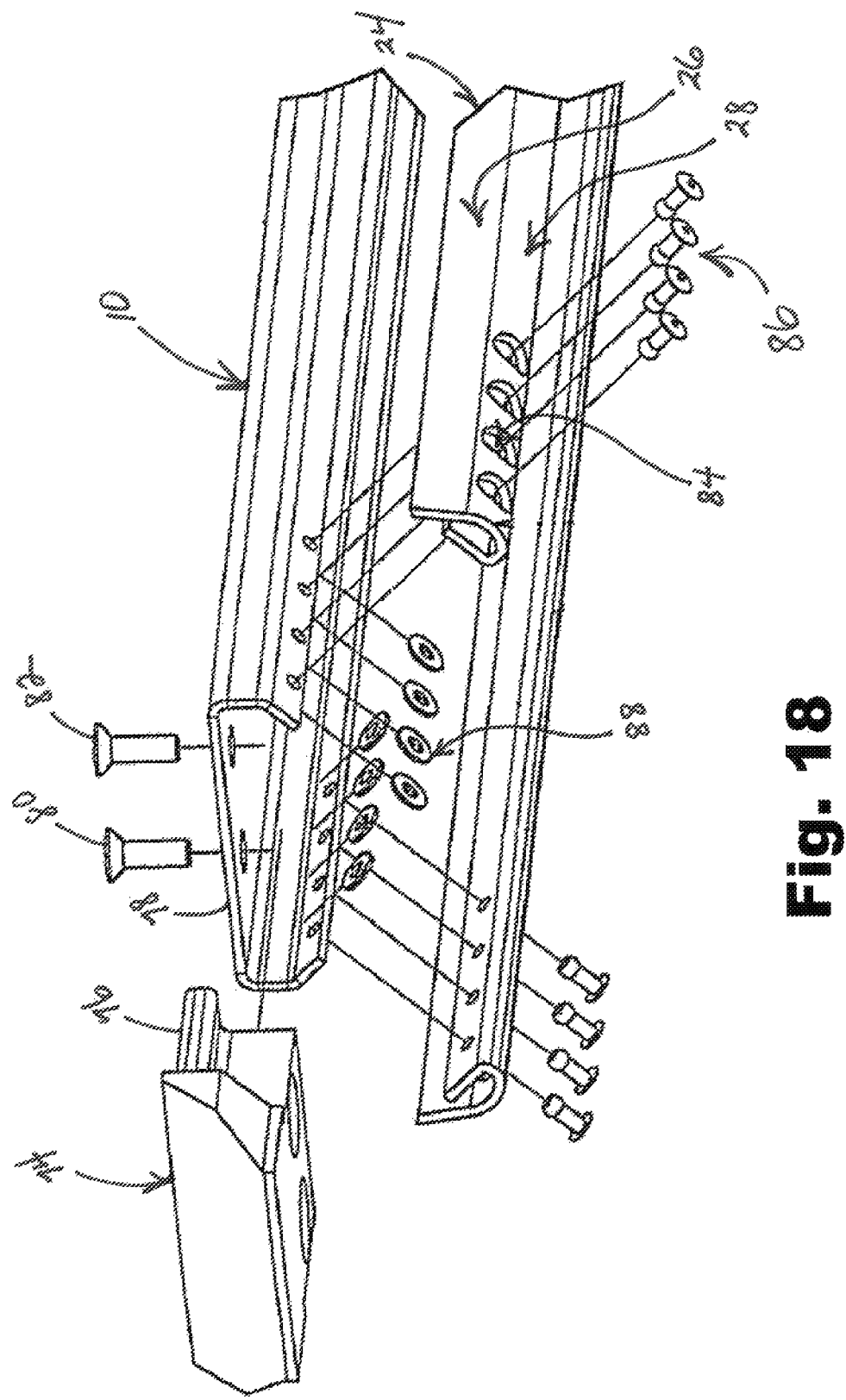
FIG. 18 is an enlarged pictorial view of the end of a roll-formed steel slat, with gap filler and end cap components exploded from the steel slat.
Figure 19:
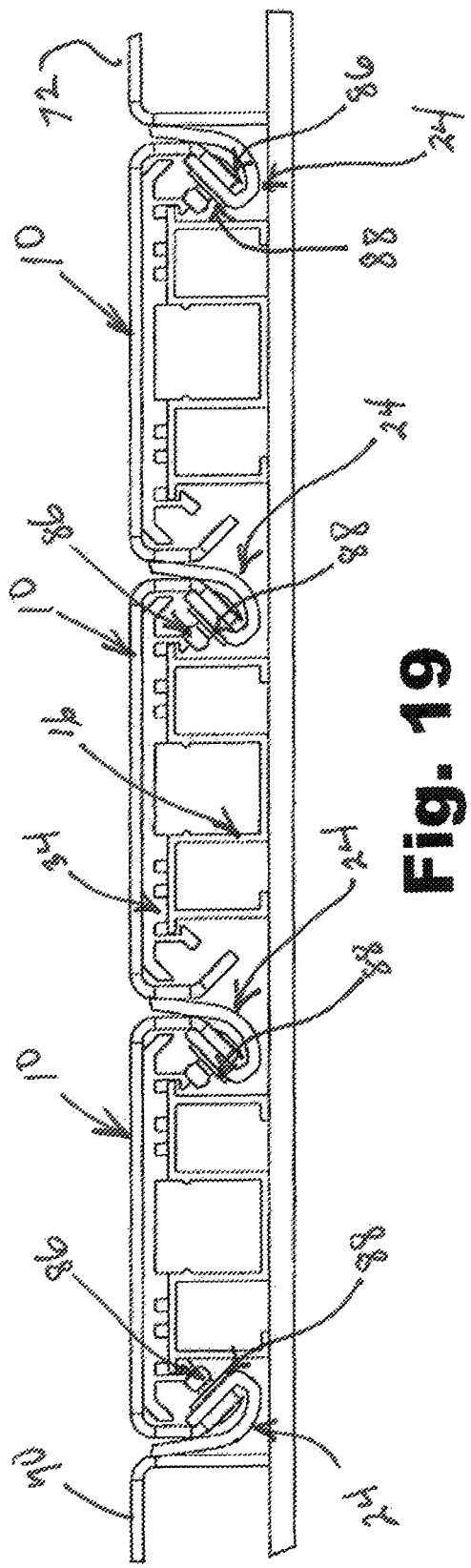
FIG. 19 is a cross-sectional view showing the final installation of the components illustrated in FIG. 18.

FIG. 18 illustrates an end cap installation for steel slat 10. It is well understood how bulk materials exit a reciprocating floor slat conveyor. In the present configuration, an end cap 74 has a portion 76 that is inserted into the end 78 of the slat 10 (there would be no bearing structure at that location). The end cap 74 is held in place by fasteners 80, 82. A series of over-sized openings (indicated generally at 84) in the lower portion 28 of the gap filler 24 at this end location enables rivet fasteners 86, 88 to secure the gap filler 24 to the slat 10 at the end location only. FIG. 19 shows the final end cap installation in cross-section.

Figure 20:
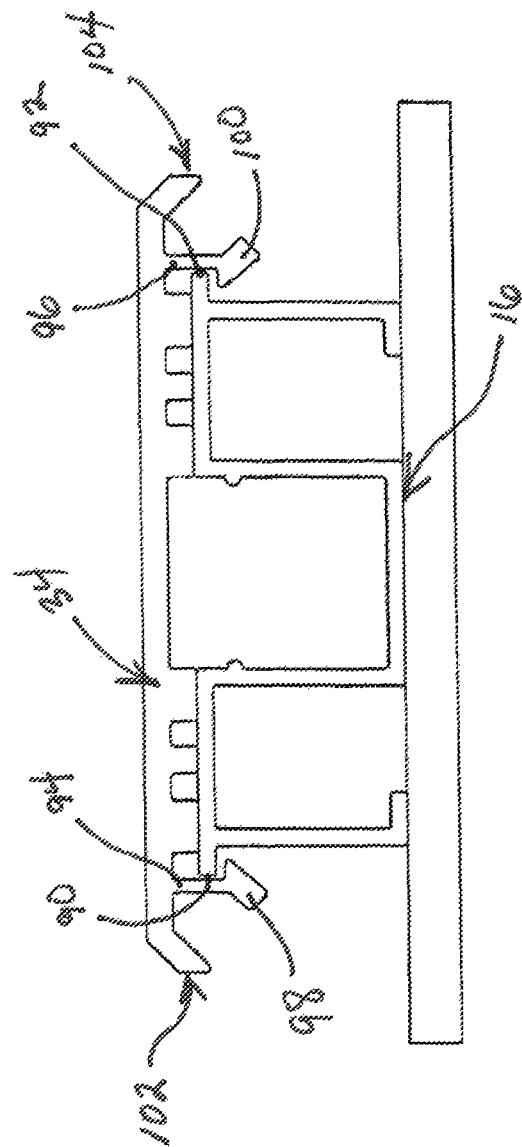
FIG. 20 is a cross-sectional view of a floor bearing resting on an aluminum subdeck component.

Finally, referring to FIG. 20, the single-piece bearing 34 described above is made to snap fit around subdeck lateral edges 90, 92. The bearing 34 can flex at locations 94, 96 so that bearing portions 98, 100 are captured in place by subdeck lateral edges 90,92. This is the same for the steel subdeck configuration 32 previously described (see FIGS. 9 and 10). The single-piece bearing 34 is otherwise captured within the perimeter or envelope defined by the top and side walls 42, 44, 46, 48, 50 of the steel slat 10.

Figure 21:
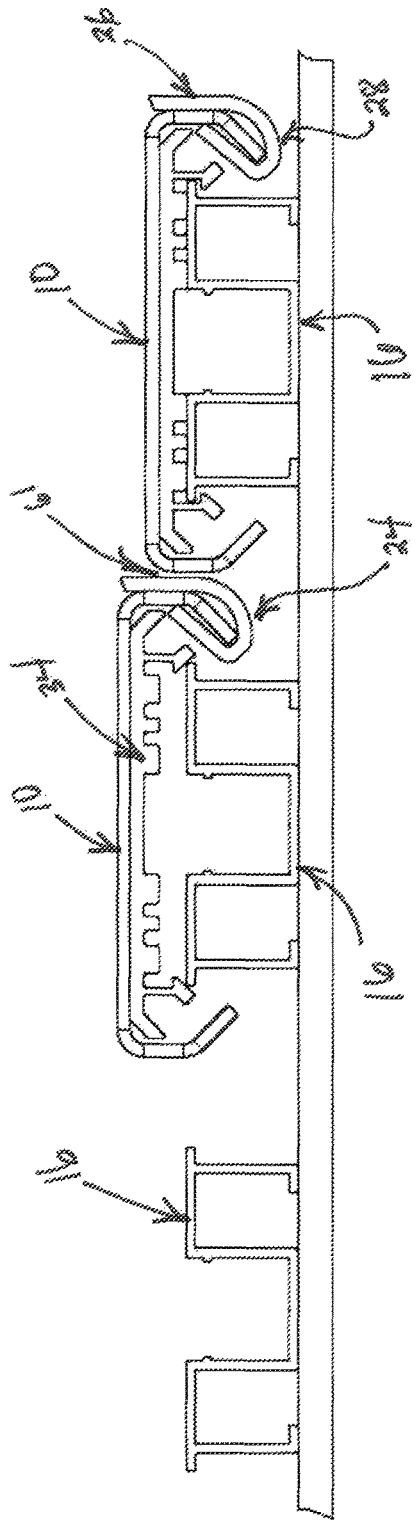
FIG. 21 is similar to FIGS. 12 and 20 in that this Figure is a cross-sectional view showing a slat/gap filler combination being pushed down onto an aluminum subdeck member during a floor slat installation sequence.
Figure 22:
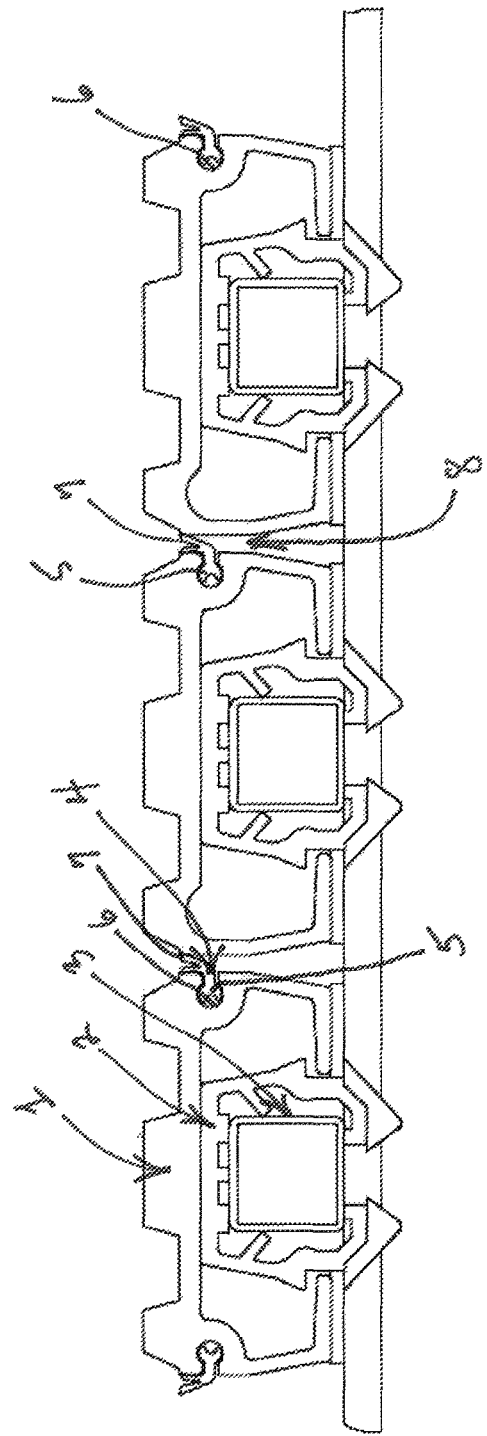
FIG. 22 is labeled "prior art" and is a cross-sectional view that shows how the gaps between side-by-side slats made of extruded aluminum have been sealed in the past.

The side-to-side width of the bearing 34 is less than the width between the opposite edges 49, 51 of the slat lower side portions 48, 50 that were previously described above (see FIG. 11, for example). Generally speaking, the side-to-side width of the bearing 34 is the distance between arrows 102 and 104 in FIG. 20. The idea is to create a bearing width within the envelope of the hollow slat 10 that is too wide for the bearing to be easily removed through the lower side of the slat. What this means is that the plurality of bearings 34 that will be used for a typical conveyor installation may be inserted end-wise into the hollow slat 10. In such case, and referring to FIG. 21, the combination of slat 10 and bearing 34 may then be installed onto the underlying subdeck structure (whether it be aluminum or steel) at the same time by snap-fitting the bearing onto the subdeck (while it is inside the slat 10) and then later securing individual slats 10 to conveyor drive structure (not shown in the drawings). The conveyor drive structure for reciprocating floor slat conveyors is well known in the art.

Figure 23:
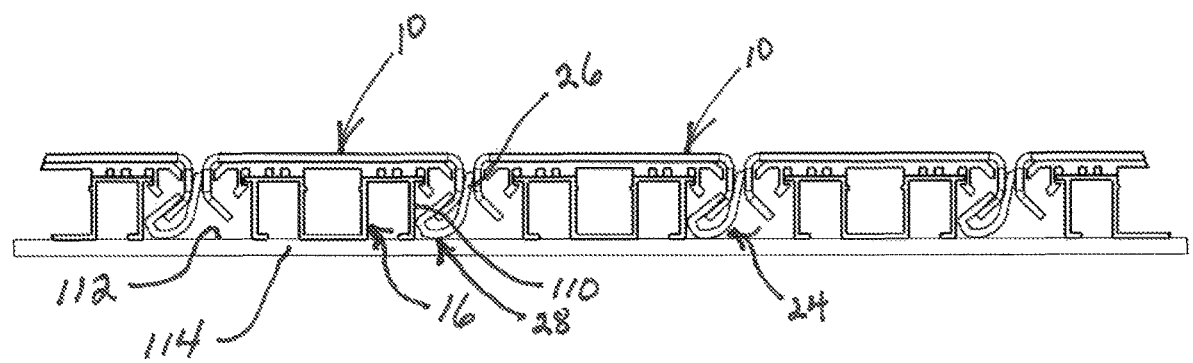
FIG. 23 is a cross-sectional view similar to FIG. 1, but illustrates the gap filler seals installed, with a lower portion of the gap filler abutting against a vertical wall surface of an aluminum subdeck.

Turning now to FIG. 23, the subdeck component or subdeck member 16 has a vertical sidewall 110. After the gap filler 24 is installed, this vertical sidewall 110 may serve as a "stop" to lateral movement of the gap filler 24, while the upper surface 112 (of the underlying cross-member 114) stops downward movement (of the gap filler 24). By way of additional explanation, forces that continually act on the gap filler 24 caused by the load on the reciprocating floor slats 10 may tend to push the upper part or portion 26 of the gap filler 24 downward between adjacent floor slats 10. This, in turn, may tend to push the lower portion 28 of the gap filler laterally and/or downwardly. This potential lateral/downward movement is constrained or stopped by vertical sidewall 110 and upper surface 112 (on the subdeck member 16 and cross-member 114, respectively).

Figure 24:
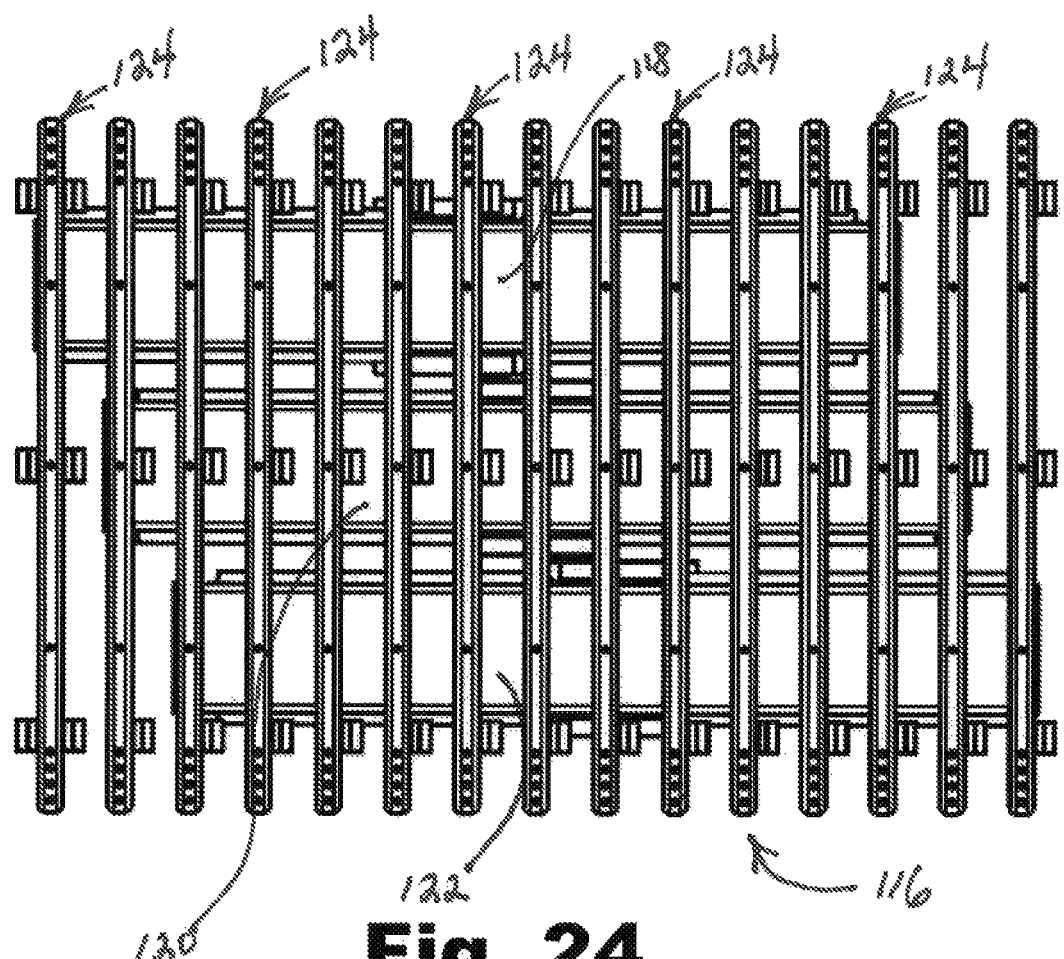
FIG. 24 is a top view of a reciprocating floor drive unit, illustrating "drive shoes" that make driving connections between the drive unit and reciprocating floor slats, and further illustrating gap filler supports that are welded or otherwise connected to the drive shoes.
Figure 25:
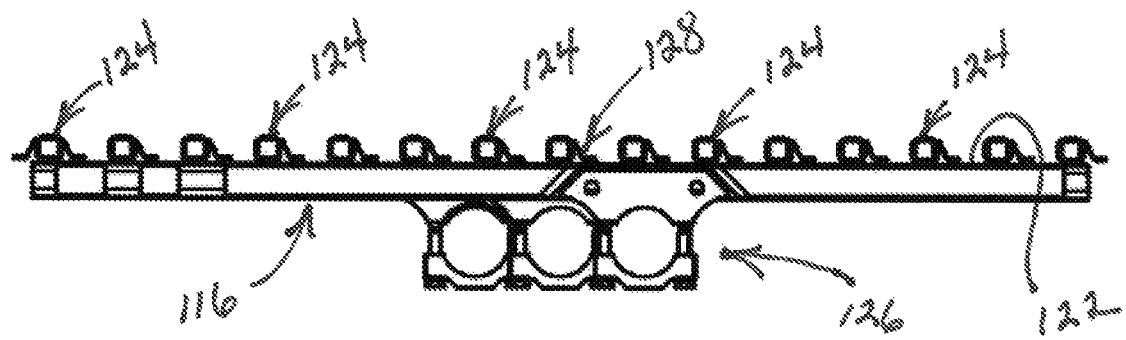
FIG. 25 is an end view of FIG. 24.
Figure 26:
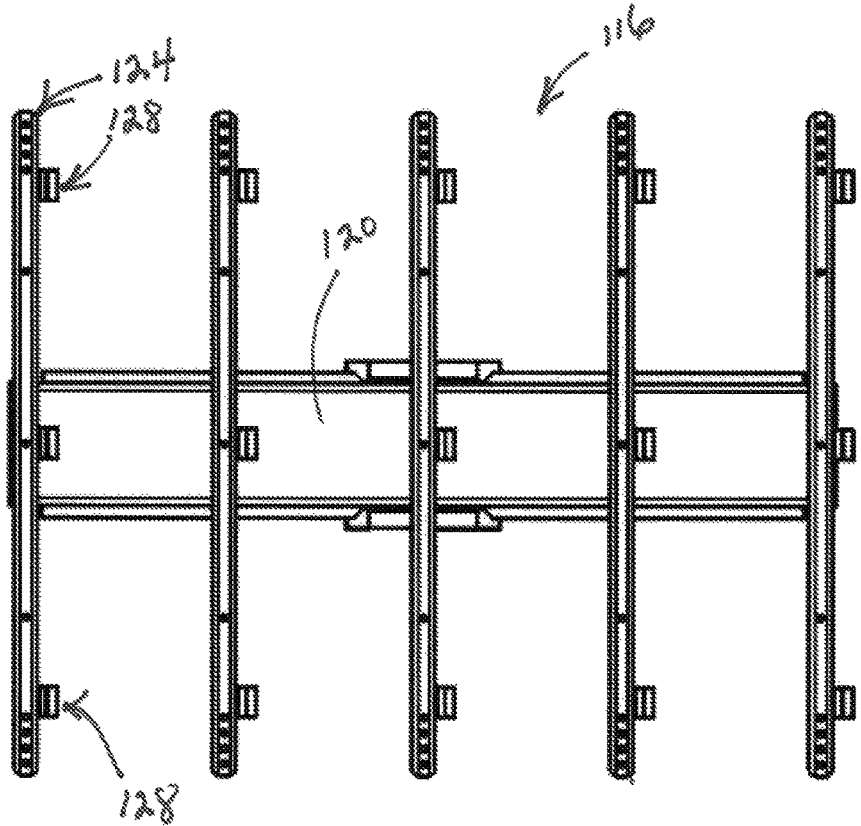
FIG. 26 is a view similar to FIG. 24, but illustrates one-third of the drive units drive shoes.

As a person familiar with reciprocating floor systems would know, these systems are typically driven by three-cylinder hydraulic drive units. The top side of an exemplary drive unit is illustrated generally at 116 in FIG. 24. The drive unit 116 typically has three cross-drives (illustrated at 118, 120, 122), with each one carrying its own set of drive shoes. The drive shoes connect the hydraulic cylinders to the reciprocating floor slats. For example, reference 124 illustrates one set of drive shoes that would correspond to one of the cross-drives just described, with that particular set driving one-third of the floor slats in the conveyor system. Reference 126 in FIG. 25 generally indicates the location of the hydraulic drive cylinders.

These details would be familiar to the person having knowledge of reciprocating floor systems. That person would also know that the drive unit requires a "window" in the subdeck components or members 16 previously described (and in underlying subdeck support structure) in order to provide a space in the reciprocating floor system to connect drive unit shoes 124 to the plurality of floor slats in the system. In this window space or region, there is no underlying subdeck 16 or cross-member or cross-support 114 structures like those illustrated and described relative to FIG. 23.

Figure 27:
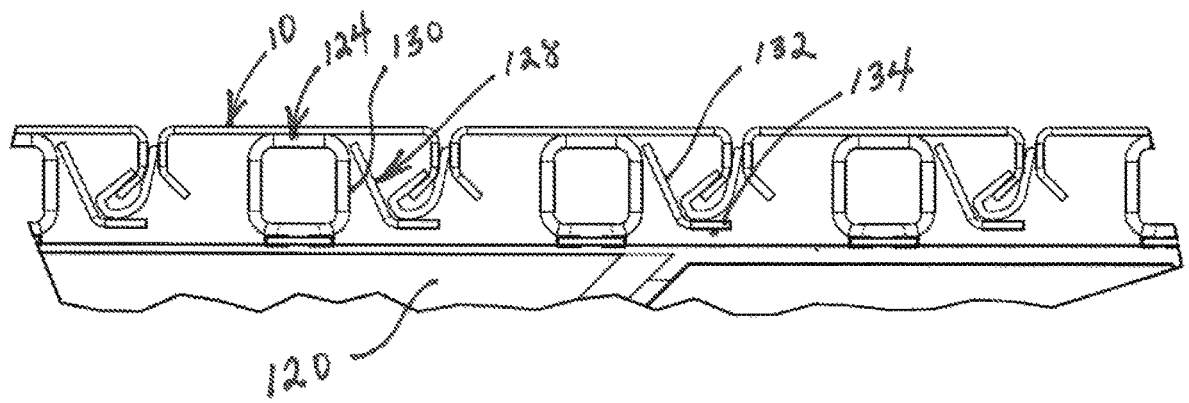
FIG. 27 is an enlarged cross-sectional view of FIG. 24.

In order to provide the same kind of gap filler physical constraints (as surfaces 110 and 112 in FIG. 23) within the drive unit's operating area, gap filler supports 128 are welded or otherwise connected to the sides 130 of each drive shoe 124. This is best illustrated in FIG. 27. Directing attention to FIG. 27, the gap filler support 128 has surfaces 132, 134 that provide the same constraining function as surfaces 110 and 112 in FIG. 23, but in the drive unit region.

Figure 28:
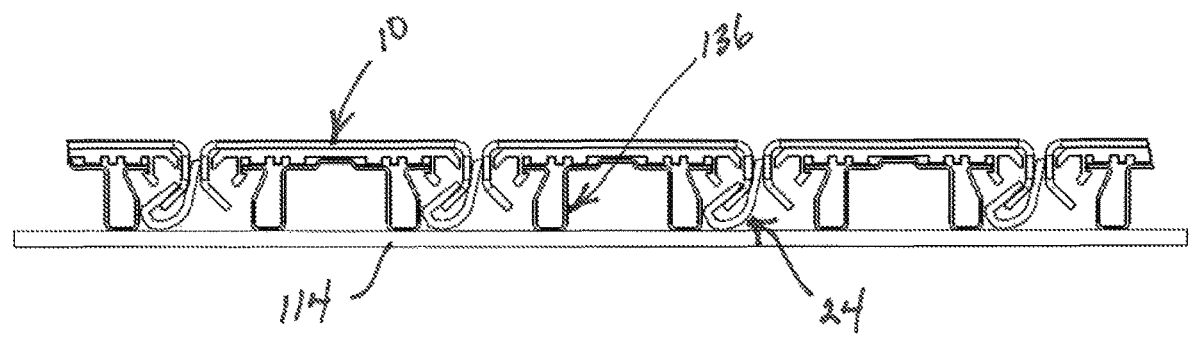
FIG. 28 is a cross-sectional view similar to FIG. 23, but illustrates a modified subdeck, consisting of modified, roll-formed steel subdeck members members.
Figure 29:
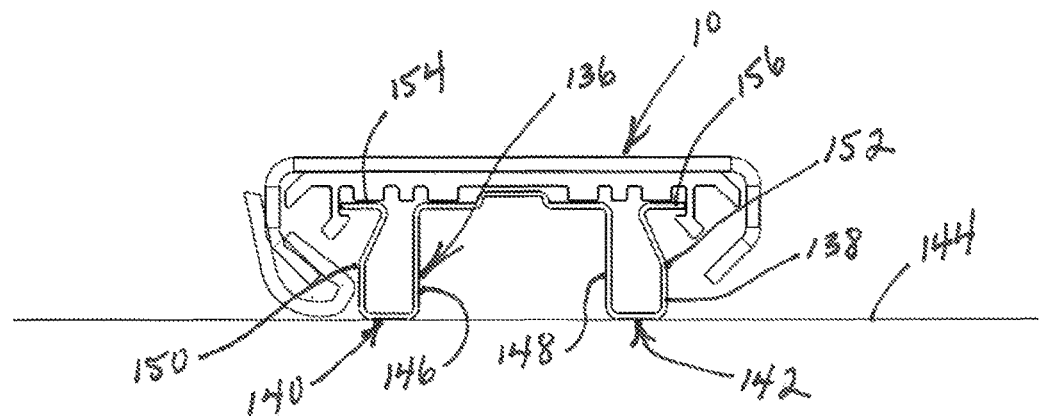
FIG. 29 is a cross-sectional view of one of the roll-formed steel subdeck members illustrated in FIG. 28.

Generally indicated at 136 in FIGS. 28 and 29 is another embodiment of a roll-formed steel subdeck. In this embodiment, the subdeck has an outer surface 138 that provides the same constraining function as surface 110 in FIG. 23. The roll-formed embodiment 136 otherwise has two leg portions 140, 142 that rest upon a cross-support surface 144. Each roll-formed leg 140, 142 is hollow in that the legs are defined by vertical inner sidewalls 146, 148 and bent outer sidewalls 150, 152. The legs 140, 142 further have outer bent portions 154, 156 that capture the single slat bearing structure 34 previously described.

It is to be understood that the design is under development and test and may change as the design is further developed. As an example, while the gap filler seal described above is intended to make steel slats a commercially viable design in the marketplace, it may later prove to work for aluminum slat configurations. For this reason, the foregoing is not intended to limit patent protection. To the extent patent protection is limited, all limits on patent protection are defined by the patent claim or claims that follow.

What is claimed is:

1. For use with a reciprocating floor slat conveyor, a combination comprising:

a plurality of reciprocating floor slats that are roll-formed from steel, wherein each one of said roll-formed steel slats has a uniform wall thickness, said slat having a top portion, a pair of substantially vertical sidewall portions that depend downwardly from opposite sides of said top portion, and a pair of inwardly slanting portions that respectively depend downwardly and inwardly from said vertical sidewall portions, and with said inwardly slanting portions having end edges that are spaced apart, and further, said slats being installed with a lengthwise gap between adjacent side-by-side slats;

a gap filler member for filling said lengthwise gap between side-by-side slats, said gap filler member having an upper portion that extends generally vertically upwardly into said lengthwise gap, and said gap filler member further having a lower portion that is wrapped around an inwardly slanting portion of said slat, with said wall thickness of said slat being pinched between an end of the lower portion and the upper portion of said gap filler member;

a slat bearing received within a space defined by said top portion, said vertical side wall portions, and said inwardly slating portions of said steel slat, with said slat bearing having a flat top surface upon which the steel slat rides, and further, said slat bearing having a side-to-side width that is less that the width of said spaced apart end edges of said inwardly slanting portions of said slat; and means near said lower portion of said gap filler member for preventing lateral and downward movement of said lower portion of said gap filler member.

\* \* \* \* \*